United States Patent
Marecek

(10) Patent No.: US 9,946,972 B2
(45) Date of Patent: Apr. 17, 2018

(54) OPTIMIZATION OF MIXED-CRITICALITY SYSTEMS

(71) Applicant: International Business Machines Corporation, Armonk, NY (US)

(72) Inventor: Jakub Marecek, Dublin (IE)

(73) Assignee: International Business Machines Corporation, Armonk, NY (US)

( * ) Notice: Subject to any disclaimer, the term of this patent is extended or adjusted under 35 U.S.C. 154(b) by 414 days.

(21) Appl. No.: 14/286,004

(22) Filed: May 23, 2014

(65) Prior Publication Data

US 2015/0339576 A1    Nov. 26, 2015

(51) Int. Cl.
  *G06N 5/04*   (2006.01)
  *H04L 29/08*  (2006.01)
  *H04L 29/06*  (2006.01)
  *G06F 17/11*  (2006.01)

(52) U.S. Cl.
  CPC ............... *G06N 5/04* (2013.01); *G06F 17/11* (2013.01); *H04L 29/08* (2013.01); *H04L 67/10* (2013.01); *H04L 67/42* (2013.01)

(58) Field of Classification Search
  CPC .. G06N 5/02; G06N 5/04; G06F 17/11; H04L 29/06; H04L 29/08; H04L 67/10; H04L 67/42
  USPC .......................................................... 706/46
  See application file for complete search history.

(56) References Cited

U.S. PATENT DOCUMENTS

| | | | |
|---|---|---|---|
| 5,148,365 A | 9/1992 | Dembo | |
| 7,653,522 B2 | 1/2010 | Peralta et al. | |
| 7,873,530 B2 | 1/2011 | Huang et al. | |
| RE42,440 E | 6/2011 | Bera et al. | |
| 8,504,335 B2 | 8/2013 | Furman et al. | |
| 2004/0210543 A1* | 10/2004 | Ouimet | G06Q 10/02 705/400 |
| 2006/0106656 A1* | 5/2006 | Ouimet | G06Q 10/06 705/7.39 |
| 2008/0140495 A1 | 6/2008 | Bhamidipaty et al. | |
| 2008/0215512 A1* | 9/2008 | Narzisi | G06N 3/126 706/13 |

(Continued)

FOREIGN PATENT DOCUMENTS

WO    WO0155939 A2    8/2001

OTHER PUBLICATIONS

Caruana F. et al., "System and Method for Robust Optimization Including Uncertainty Models", WO 01/55939 A2, Aug. 2, 2001.*

(Continued)

*Primary Examiner* — Dave Misir
(74) *Attorney, Agent, or Firm* — Francis Lammes; Stephen J. Walder, Jr.; Kurt P. Goudy

(57) ABSTRACT

A mechanism is provided for optimization of mixed-criticality systems. A plurality of strategies is received that are in a fixed order of criticality. For each strategy in the plurality of strategies, a multivariate objective function and a multivariate constraint in a multivariate decision variable is obtained. A number of strategies of the plurality of strategies that are feasible in combination are maximized. A solution that is feasible for the number of strategies that are feasible in combination is generated such that the objective of a least-critical strategy that is feasible in combination with the other strategies in the number of strategies is optimized.

15 Claims, 3 Drawing Sheets

(56) References Cited

U.S. PATENT DOCUMENTS

| | | | |
|---|---|---|---|
| 2010/0185557 A1* | 7/2010 | Hunter | G06Q 10/00 |
| | | | 705/36 R |
| 2010/0332442 A1* | 12/2010 | Goel | G06Q 10/06 |
| | | | 706/52 |
| 2011/0022363 A1 | 1/2011 | Furman et al. | |
| 2011/0082895 A1 | 4/2011 | Everest | |
| 2011/0125702 A1 | 5/2011 | Gorur Narayana Srinivasa et al. | |
| 2011/0307230 A1* | 12/2011 | Lee | G01V 99/00 |
| | | | 703/10 |
| 2012/0010919 A1 | 1/2012 | Aswal et al. | |
| 2012/0035984 A1 | 2/2012 | Gorur Narayana Srinivasa et al. | |
| 2012/0232701 A1* | 9/2012 | Carty | G05B 15/02 |
| | | | 700/277 |
| 2013/0110473 A1* | 5/2013 | Cantu | G06N 5/003 |
| | | | 703/2 |
| 2013/0159045 A1 | 6/2013 | Ettl et al. | |
| 2014/0052408 A1 | 2/2014 | Mevissen et al. | |
| 2014/0052409 A1* | 2/2014 | Mevissen | G06F 17/11 |
| | | | 702/181 |

OTHER PUBLICATIONS

Tamas-Selicean D. et al., "Design Optimization of Mixed-Criticality Real-Time Applications on Cost-Constrained Partitioned Architectures", 32nd IEEE Real-Time Systems Symposium, 2011.*

Tămaş -Selicean, D., S. O. Marinescu, and Paul Pop. "Analysis and optimization of mixed-criticality applications on partitioned distributed architectures." System Safety, incorporating the Cyber Security Conference, 2012.*

Burns A. et al., "Mixed Criticality Systems—A Review", Department of Computer Science, University of York, Tech. Report, 2013.*

List of IBM Patents or Patent Applications Treated as Related (Appendix P), 1 page.

"Assessment of Demand Response & Advanced Metering", Federal Energy Regulatory Commission, Staff Report, Nov. 2011, 24 pages.

"MIT Study on the Future of the Electric Grid", Chapter 7: Engaging Electricity Demand, https://mitei.mit.edu/system/files/Electric_Grid_7_Engaging_Electricity_Demand.pdf, retrieved Feb. 12, 2014, pp. 143-174.

Baruah, Sanjoy et al., "Scheduling real-time mixed-criticality jobs", IEEE Transactions on Computers 61.8 (2012) 1140-1152, Draft Apr. 11, 2011, Version 1 Nov. 23, 2011, 30 pages.

Blanco-Gutierrez, et al., "Cost-effectiveness of groundwater conservation measures: A multi-level analysis with policy implications", Agricultural Water Management 98, 2011, pp. 639-652.

Busing, Christina et al., "Robust Optimization under Multi-band Uncertainty, Part I: Theory", http://arxiv.org/pdf/1301.2734.pdf, dated Mar. 14, 2013, retrieved Feb. 12, 2014, 23 pages.

Cacchiani, Valentina et al., "Recoverable Robustness for Railway Rolling Stock Planning", 8th Workshop on Algorithmic Approaches for Transportation Modeling, Optimization, and Systems (ATMOS'08), http://vesta.informatik.rwth-aachen.de/opus/volltexte/2008/1590/pdf/08002.Cacchiani.1590.pdf, Dagstuhl, Germany, Sep. 18, 2008, 13 pages.

Chao, Hung-Po et al., "Multilevel demand subscription pricing for electric power", Energy Economics, http://www.sciencedirect.com/science/article/pii/0140988386900010, Final manuscript received Aug. 12, 1985, vol. 8, Issue 4, Oct. 1986, pp. 199-217.

Chen, Wenqing et al., "Goal Driven Optimization", Operations Research, vol. 57, No. 2, published online Jan. 21, 2009, 31 pages.

Chen, Yan et al., "Water demand management: A case study of the Heihe River Basin in China", Physics and Chemistry of the Earth 30, 2005, pp. 408-419.

Dupacova, Jitka, "Stress Testing via Contamination", Coping with Uncertainty, vol. 581 of Lecture Notes in Economics and Mathematical Systems, 2006, pp. 29-46.

Eisenbrand, Friedrich et al., "Solving an Avionics Real-Time Scheduling Problem by Advanced IP-Methods", Proceedings of the 18th Annual European Conference on Algorithms: Part I, (ESA'10), http://infoscience.epfl.ch/record/149244/files/ESA-computational.pdf?version=1&origin=publication_detail, Berlin, Heidelberg, 2010, 14 pages.

Feng, Chao et al., "A Kinship Function Approach to Robust and Probabilistic Optimization Under Polynomial Uncertainty", IEEE Transactions on Automatic Control, vol. 56, No. 7, Jul. 2011, pp. 1509-1523.

Fischetti, Matted et al., "Light Robustness", Robust and Online Large-Scale Optimization: Models and Techniques for Transportation Systems, vol. 5868 of Lecture Notes in Computer Science, http://www.dei.unipd.it/~fisch/papers/light_robustness.pdf, 2009, 21 pp.

Goerigk, Marc , "Algorithms and Concepts for Robust Optimization", Dissertation, University of Gottingen, 2012, 213 pages.

Huber, Bernhard et al., "A Resource Management Framework for Mixed-Criticality Embedded Systems", IEEE 34th Annual Conference of Industrial Electronics (IECON'08), Orlando, Florida, Nov. 10-13, 2008, pp. 2425-2431.

Islam, Shariful et al., "A Multi Variable Optimization Approach for the Design of Integrated Dependable Real-Time Embedded Systems", Proceedings of the 2007 International Conference on Embedded and Ubiquitous Computing (EUC'07), 2007, pp. 517-530.

Kenney, Douglas S. et al., "Use and Effectiveness of Municipal Water Restrictions During Drought in Colorado", Journal of the American Water Resources Association, American Water Resources Association, Feb. 2004, pp. 77-87.

Li, Haohan, "Scheduling Mixed-Criticality Real-Time Systems", Dissertation, University of North Carolina at Chapel Hill, 2013, 104 pages.

Paschalidis, Ioannis Ch. et al., "Robust Linear Optimization: On the benefits of distributional information and applications in inventory control", Proceedings of the 44th IEEE Conference on Decision and Control, and the European Control Conference 2005, Seville, Spain, Dec. 12-15, 2005, pp. 4416-4421.

Taheri, Nicole A., "Linear Optimization Methods for Vehicle Energy and Communication Networks", Dissertation, submitted to the Institute for Computational and Mathematical Engineering and the Committee on Graduate Studies of Stanford University, Jun. 2012, 83 pages.

Triquet, Benoit, "Mixed Criticality in Avionics", Airbus, http://cordis.europa.eu/fp7/ict/embedded-systems-engineering/presentations/triquet.pdf, Mar. 5, 2012, 7 pages.

Vestal, Steve, "Preemptive Scheduling of Multi-Criticality Systems with Varying Degrees of Execution Time Assurance", 38th IEEE International Real-Time Systems Symposium (RTSS'07), Tucson, Arizona, Dec. 3-6, 2007, pp. 239-243.

\* cited by examiner

OPTIMIZATION OF MIXED-CRITICALITY SYSTEMS

BACKGROUND

The present application relates, generally, to an improved data processing apparatus and method and, more specifically, to mechanisms for optimization of mixed-criticality systems.

Problems of optimization under uncertainty are characterized by the necessity of making decisions without knowing what the decision's full effects will be. Such problems appear in many areas of application and do present many interesting challenges. Traditional models of decision-making under uncertainty assume distributional information about random variables, or empirical approximations thereof, are available. Often, one assumes empirically, but infinitely accurately observed values of a random variable are available, among which there is no ordering. Nevertheless, an observation of an extreme value may yield a different response than observations concentrated around the empirical mean, and precise means of measurement are rarely available in practice. Any approach based on poor modeling and erroneous inputs might be infeasible or exhibit poor performance when implemented.

SUMMARY

In one illustrative embodiment, a method, in a data processing system, is provided for optimization of mixed-criticality systems. The illustrative embodiment receives a plurality of strategies, wherein the plurality of strategies is in a fixed order of criticality. For each strategy in the plurality of strategies, the illustrative embodiment obtains a multivariate objective function and a set of multivariate constraints in a multivariate decision variable. The illustrative embodiment maximizes a number of strategies of the plurality of strategies that are feasible combination, under the constraint that for all feasible strategies, all more critical strategies are also feasible. The illustrative embodiment generates a solution that is feasible for the number of strategies that are feasible in combination, such that the objective of a least-critical strategy that is feasible in combination with the other strategies in the number of strategies is optimized.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

As stated previously, any approach based on poor modeling and erroneous inputs might be infeasible or exhibit poor performance when implemented. Therefore, the illustrative embodiments provide an approach where different realizations of uncertainty allow for structurally different problems to be solved, while allowing for imprecision in the data available to solvers for the problems. The illustrative embodiments provide a mechanism for optimization of mixed-criticality systems. The mechanisms utilize a model of uncertainty, where there are a plurality of contingency scenarios or strategies, each comprising a multivariate decision variable, a multivariate objective, multivariate equality and/or inequality constraints, and a set of uncertainty parameters. The plurality of contingency scenarios or strategies is ordered by a "criticality" associated with each of the contingency scenarios or strategies. The mechanisms produce a solution that is simultaneously feasible under as many contingency strategies, in the criticality order, as possible, while also optimizing the objective function of a less-critical contingency strategy, where the less-critical contingency strategy is feasible in combination with other more critical contingency strategies.

Current approaches to optimization under uncertainty fail to consider any ordering of the scenarios or strategies. Most also do not consider uncertainty in the samples of the multivariate random variable. In deterministic optimization, this ordering may be seen as an extension of preemptive goal programming. That is, current approaches fail to consider both uncertainty in the parameters and multiple sets of variables or constraints or uncertain parameters at the same time.

A "mechanism," as used herein, may be an implementation of the functions or aspects of the illustrative embodiments in the form of an apparatus, a procedure, or a computer program product. The mechanisms described herein may be implemented as specialized hardware, software executing on general purpose hardware, software instructions stored on a medium such that the instructions are readily executable by specialized or general purpose hardware, a procedure or method for executing the functions, or a combination of the above.

Figure 1:
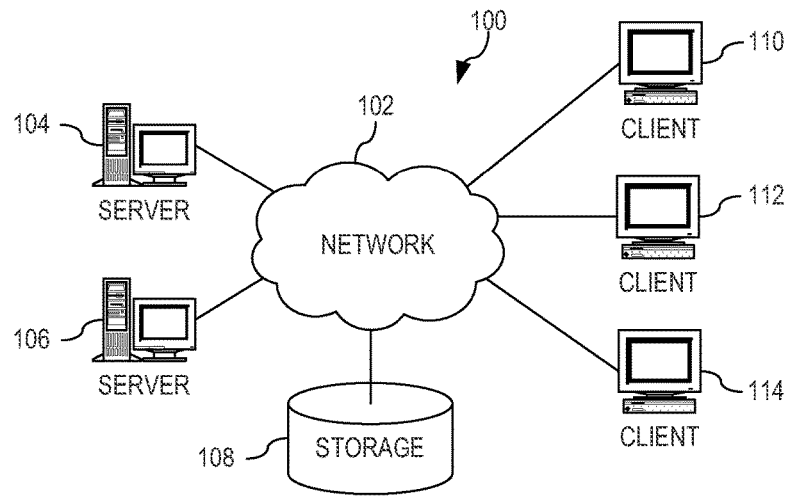
FIG. 1 is an example diagram of a distributed data processing system in which aspects of the illustrative embodiments may be implemented.
Figure 2:
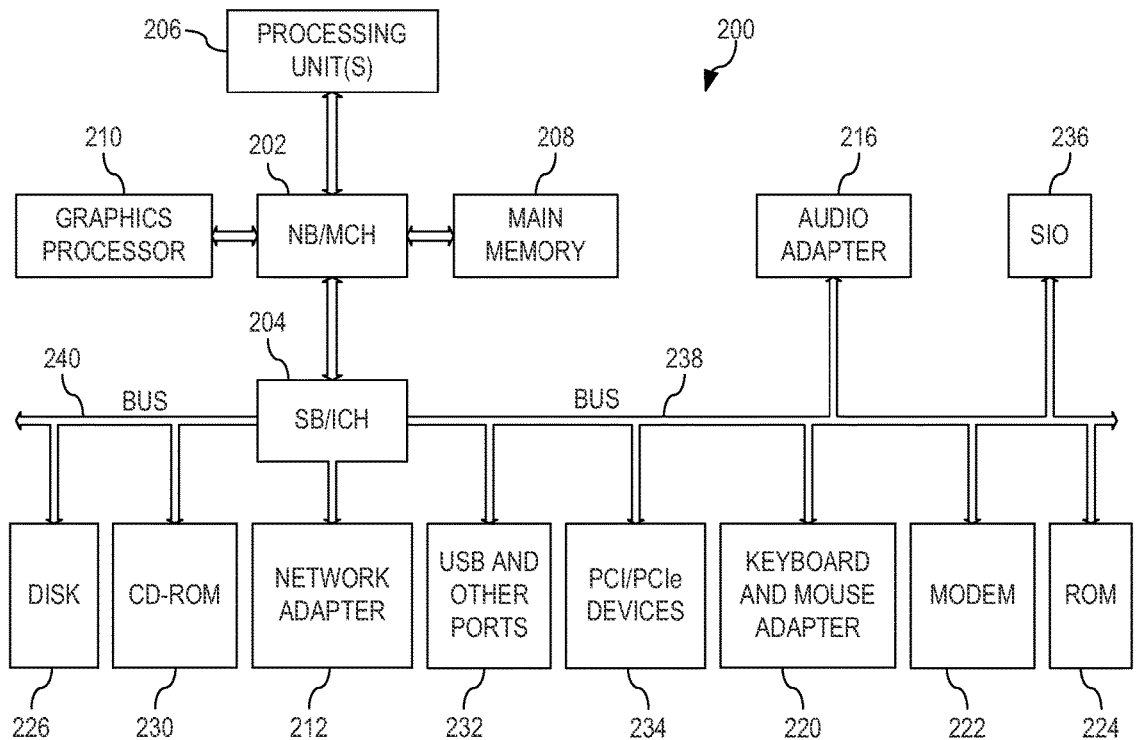
FIG. 2 is an example block diagram of a computing device in which aspects of the illustrative embodiments may be implemented.

Thus, the illustrative embodiments may be utilized in many different types of data processing environments. In order to provide a context for the description of the specific elements and functionality of the illustrative embodiments, FIGS. 1 and 2 are provided hereafter as example environments in which aspects of the illustrative embodiments may be implemented. It should be appreciated that FIGS. 1 and 2 are only examples and are not intended to assert or imply any limitation with regard to the environments in which aspects or embodiments of the present invention may be implemented. Many modifications to the depicted environments may be made without departing from the spirit and scope of the present invention.

FIG. 1 depicts a pictorial representation of an example distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

FIG. 2 is a block diagram of an example data processing system in which aspects of the illustrative embodiments may be implemented. Data processing system 200 is an example of a computer, such as client 110 in FIG. 1, in which computer usable code or instructions implementing the processes for illustrative embodiments of the present invention may be located.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240, PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft® Windows 7®. An object-oriented programming system, such as the Java™ programming system, may run in conjunction with the operating system and provides calls to the operating system from Java™ programs or applications executing on data processing system 200.

As a server, data processing system 200 may be, for example, an IBM® eServer™ System p® computer system, running the Advanced Interactive Executive (AIX®) operating system or the LINUX® operating system. Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware in FIGS. 1 and 2 may vary depending on the implementation. Other internal hardware or peripheral devices, such as flash memory, equivalent non-volatile or optical disk drives and the like, may be used in addition to or in place of the hardware depicted in FIGS. 1 and 2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device that is configured with flash memory to provide non-volatile memory for storing operating system files and/or user-generated data, for example. Essentially, data processing system 200 may be any known or later developed data processing system without architectural limitation.

Again, the illustrative embodiments provide a mechanism for optimization of mixed-criticality systems. Utilizing a model of uncertainty, where there are a plurality of contingency scenarios or strategies, each comprising decision variable, a multivariate objective, multivariate equality and/or inequality constraints, and a set of uncertainty parameters, to meet a common objective, the illustrative embodiments produce a solution that is simultaneously feasible under as many contingency strategies, in the criticality order, as possible, while also optimizing the objective function of a less-critical contingency strategy where the less-critical contingency strategy may be feasible in combination with other more critical contingency strategies. Specifically, the illustrative embodiments solve optimization problems, which combine strictly ordered contingency strategies with uncertainty sets $Z^{(s)}$ given by $\xi$, $U^{(s)}$, such as interval-based, polyhedral, ellipsoidal, spectrahedral, or the like, or any combination thereof.

Figure 3:
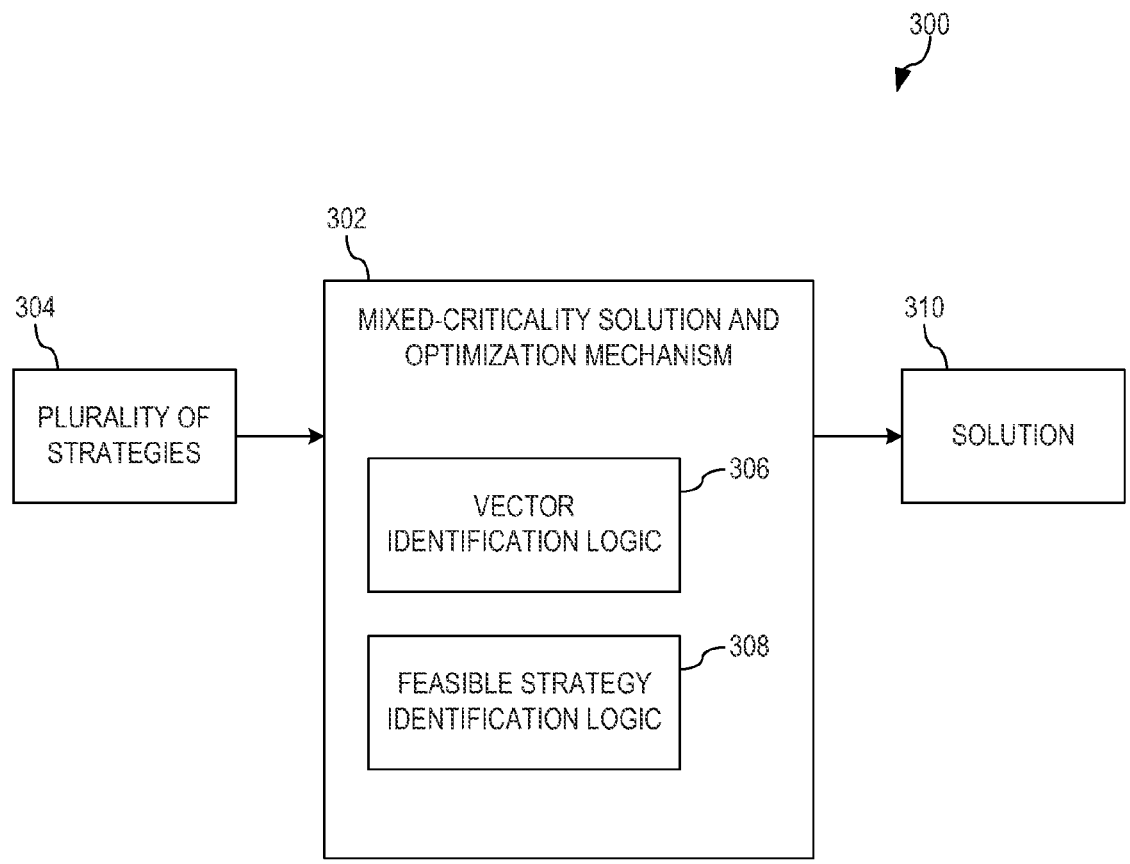
FIG. 3 is a functional block diagram of a mixed-criticality solution and optimization mechanism in accordance with an illustrative embodiment.

FIG. 3 is a functional block diagram of a mixed-criticality solution and optimization mechanism in accordance with an illustrative embodiment. Data processing system 300 comprises mixed-criticality solution and optimization mechanism 302 which receives a plurality of strategies 304, the plurality of strategies 304 in a fixed order of criticality. For each strategy(s) in the plurality of strategies (S) 304, there is a multivariate objective and multivariate constraints, both of which may make use of a set of uncertainty parameters ($U^{(s)}$). The vector identification logic 306 identifies a mixed-criticality solution, as given by a multivariate decision variable ($x=[x^{(1)} \ldots x^{(s)}]$), and the number of strategies s the mixed-criticality solution x is feasible for.

In order to identify those strategies that may be solved in combination and in decreasing level of criticality, feasible strategy identification logic 308 (i.e., a solver) ensures that a first strategy, which is a most critical strategy, is feasible by solving:

$$P(1,\xi): \min f^{(1)}(x^{(1)},\xi,U^{(1)}) \text{ s.t. } x^{(1)} \in X^{(1)}(\xi,U^{(1)})$$

where $P(1, \xi)$ denotes the problem solved, $\xi$ is the multivariate random variable, $x^{(1)}$ is the decision variable for the most critical strategy, $f^{(1)}$ is the objective function for the strategy and $X^{(1)}$ is the feasible region for the strategy, defined by the inequalities $F^{(1)}(x^{(1)}, \xi, U^{(1)}) \leq 0$ and equalities $G^{(1)}(x^{(1)}, \xi, U^{(1)})=0$, which may make use of the uncertainty parameters $U^{(1)}$ for the given strategy. If feasible strategy identification logic 308 finds that there exists a feasible solution to $P(1, \xi)$, then feasible strategy identification logic 308 decides whether the first strategy and a second strategy, which is the next strategy in the fixed order of criticality after the first strategy, is feasible by solving:

$$P(2,\xi): \min f^{(2)}([x^{(1)}x^{(2)}],\xi,U^{(2)}) \text{ s.t. } x^{(1)} \in X(\xi,U^{(1)}), [x^{(1)}x^{(2)}] \in X(\xi,U^{(2)})$$

If feasible strategy identification logic 308 finds that the solution $P(2, \xi)$ is feasible, feasible strategy identification logic 308 adds a next strategy to the current strategies and solves until $P(s+1, \xi)$ is infeasible, in which case the solution to $P(s, \xi)$ is produced, or until s+1=S, which is the plurality of strategies (S) 304, in which case the solution to $P(s+1, \xi)$ is produced. Thus, for (S) strategies, feasible strategy identification logic 308 solves:

$$P(\xi): \max_s \min_{f^{(s)}} ([x^{(1)} \ldots x^{(s)}],\xi,U^{(s)}) \text{ s.t. } x^{(1)} \in X(\xi,U^{(1)}), [x^{(1)}x^{(2)}] \in X(\xi,U^{(2)}); [x^{(1)} \ldots x^{(s)}] \in X(\xi,U^{(s)}); 1 \leq s \leq S$$

Thus, $P(s, \xi)$ is feasible if and only if $P(s-1, \xi)$ is feasible.

Clearly, as further constraints are added, uncertain estimates may become less uncertain, less conservative, or both. For example in ellipsoidal uncertainty, the ellipsoids may shrink, move, or be transformed similarly. In the special case of interval uncertainty, this is sometimes referred to as multi-band uncertainty.

As suggested above, there is a special case, where there is a particular structure to the decision variable and constraints X with index sets $\{1, 2, \ldots, n\}$ and $\{1, 2, \ldots, u\}$ corresponding to the decision variable $x=[x^{(1)} \ldots x^{(S)})]$ in $\mathbb{R}^n$ and constraints defining the feasible sets are partitioned to S non-empty parts. At the level of criticality of a particular strategy s, only the first s parts of the index sets are employed, i.e. $[x^{(1)} \ldots x^{(s)}]$, but both new scalar decision variables and new constraints are added in each strategy.

Accordingly, once feasible strategy identification logic 308 adds a next strategy to the current strategies and identifies that $P(s+1, \xi)$ is infeasible and cannot add an additional strategy since s+1=S, feasible strategy identification logic 308 has then produced a solution 310 that is simultaneously feasible under as many strategies, in the given criticality order, as possible. With this solution, feasible strategy identification logic 308 generates a contingency plan that meets a common objective while encompassing more strategies and allowable variables than only those listed in the one strategy that may be currently implemented.

For example, in a contingency plan where there are five strategies with the fifth strategy being the most critical and thereby the most limiting, allowing activities A and B, feasible strategy identification logic 308 may identify that not only activities A and B may be implemented, but also activity D from strategy 4 and, activity E from strategy 3, and activity G from strategy 2 is feasible. Further, the objective of stage 2 will be optimized.

In addition to producing a solution that is simultaneously feasible under as many strategies, in the given criticality order, as possible, feasible strategy identification logic 308 also optimizes the objective function of the least critical strategy, where a feasible solution may be obtained. In many applications, the objective matched with the most critical strategies is a function of a number of expensive or undesirable operations to perform. For example, in applications related to water scarcity, where an entity optimizes over the flows and pressures in the network, and thereby the restrictions on use, the entity may want to minimize, in the decreasing order of criticality, measures of the restrictions on the use of water, the number of changes of settings of pressure-reducing valves, which are not remotely configurable and hence require a technician to be dispatched to the site, and equalize the pressure across the network, across the residential customers, or the like. In applications to power systems, the entity may minimize the numbers of involuntary load shedding interventions and voluntary load shedding interventions and minimize the expense of signal-based demand response management in the order of decreasing criticality.

Notice that by warm-starting the solution process with the solution at the previous level of criticality, feasible strategy identification logic 308 "guides" the decision process and thus increases a speed at which the feasibility of strategy combination may be verified.

The following are examples of applying the inventive features of the illustrative embodiments, although the illustrative embodiments are not limited to only these applications. That is, the inventive features of the illustrative embodiments are envisioned to be applicable to many other applications without departing from the sprit and scope of the invention.

A first example is utilization in power systems. In traditional contingency planning, a country may have a weak power network with a high penetration of renewable sources in the west and nuclear power stations in the east. If there is a major mismatch between power generated and demanded, the power network may first disconnect a small region surrounding the bus, where there is the mismatch, and in a number of increments the whole of the eastern part of the country. The strategy, where only the nuclear power stations in the west are operational, is the most critical. Each strategy may entail the optimal power flow problem, where voltages and power generation are decided upon.

In a second power system application, a power company performs demand response management by shedding load. First, the power company disconnects charging electric cars, major refrigeration facilities, and similar customers, who have agreed to interruptible supply, before shedding load of normal customers and, ultimately, priority customers. The strategy where the demand of priority customers is met is the most critical. Each strategy may entail the optimal power flow problem, where voltages and power generation are decided upon.

In water distribution networks, a water company may have to introduce water usage restrictions. First, the water company restricts the use for watering public lawns and filling public pools, and progressively restricts all but the essential domestic use and that of priority customers. Each strategy may entail the decision on the pressure and flow in the pipes and the change in the levels of the reservoirs.

In an airline industry, an airline company often needs to readjust schedule of the flights and tail assignment on the day of operations, delaying some flights (transports), exchanging aircraft, and cancelling others. First, the airline company delays flights, which are not delayed too much yet. Progressively, the airline company starts cancelling flights without first-class or priority passengers. Similar actions may be performed by operators of other transport companies.

In aircraft, cars, and other complex systems, some of the key components are operated such that, if some operations take too long, the system may still perform the most critical operations. For example, in scheduling an embedded bus, the company may decide not to transmit signals sent from the entertainment system to the displays and speakers, if other transmissions take too long. Progressively, the company may support much longer transmission times at the price of disconnecting all but the engine and brakes. In each strategy, the company may want to minimize the cycle time or properties at design time or at a maximum time since a successful transmission between a source-destination pair has occurred.

Again, these examples are merely for illustration and the present invention is not limited to only these applications. Many other applications of the present invention are envisioned without departing from the spirit and scope of the invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Figure 4:
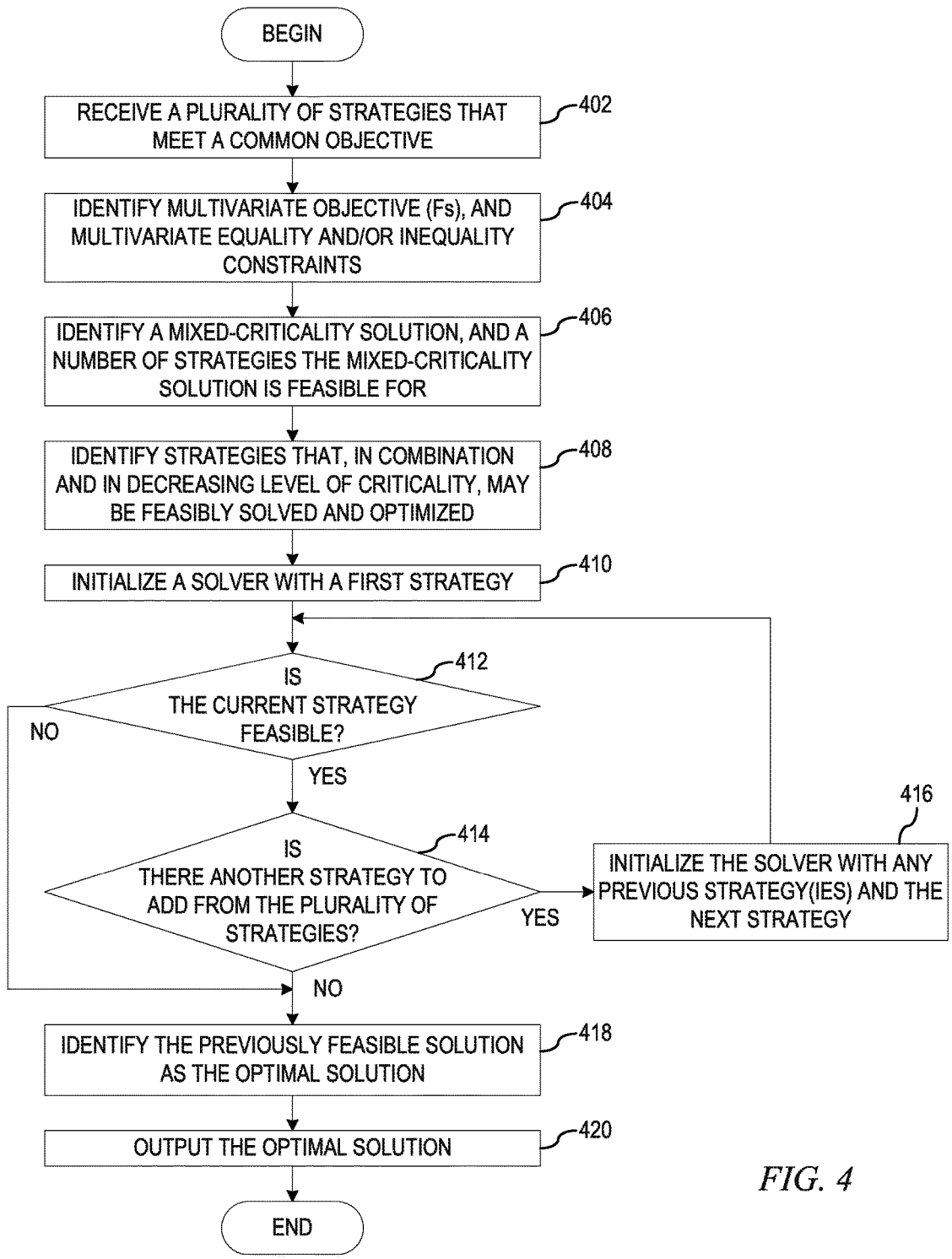
FIG. 4 depicts a flowchart of an exemplary operation performed by a mixed-criticality solution and optimization mechanism in accordance with an illustrative embodiment.

FIG. 4 depicts a flowchart of an exemplary operation performed by a mixed-criticality solution and optimization mechanism in accordance with an illustrative embodiment. As the operation begins, the mixed-criticality solution and optimization mechanism receives a plurality of strategies that meet a common objective (step 402). The plurality of strategies is in a fixed order of criticality. For each strategy (s) in the plurality of strategies (S), the mixed-criticality solution and optimization mechanism identifies a multivariate objective ($f^{(s)}$) and multivariate equality and/or inequality constraints, which may make use of a set of uncertainty parameters ($U^{(s)}$) (step 404). The mixed-criticality solution and optimization mechanism also identifies a mixed-criticality solution, as given by a decision variable ($x=[x^{(1)} \ldots x^{(S)}]$), and a number of strategies s the mixed-criticality solution is feasible for (step 406). With the plurality of vectors associated with each strategy(ies) identified, the mixed-criticality solution and optimization mechanism identifies strategies that, in combination and in decreasing level of criticality, may be feasibly solved and optimized (step 408).

In order to identify those strategies that may be solved in combination and in decreasing level of criticality, the mixed-criticality solution and optimization mechanism initializes a solver with a first strategy, which is a most critical strategy, using:

$$P(\xi):\max_s\min_x f^{(s)}([x^{(1)} \ldots x^{(s)}],\xi,U^{(s)}) \text{ s.t. } x^{(1)} \in X(\xi,U^{(1)}),[x^{(1)}x^{(2)}] \in X(\xi,U^{(2)}); [x^{(1)} \ldots x^{(s)}] \in X(\xi,U^{(s)}); 1 \leq s \leq S$$

where $P(\xi)$ denotes the problem solved, $\xi$ is the multivariate random variable, $x=[x^{(1)} \ldots x^{(s)}]$ is the decision variable, $f^{(s)}([x^{(1)} \ldots x^{(s)}], \xi, U^{(s)})$ is the objective function of the least-critical strategy supported, and $X^{(s)}$ is the feasible region for the strategy s (step 410). The mixed-criticality solution and optimization mechanism then determines whether the current strategy is feasible with the current one or more strategies (step 412). If at step 412 the mixed-criticality solution and optimization mechanism determines that the current strategy is feasible, then the mixed-criticality solution and optimization mechanism determines whether there is another strategy to add from the plurality of received strategies (step 414). If at step 414 there is another strategy, then the mixed-criticality solution and optimization mechanism initializes the solver with any previous strategy(ies) and the next strategy (step 416), with the operation returning to step 412.

If at step 412 the mixed-criticality solution and optimization mechanism determines that the current strategy is not feasible or if at step 414 there is not another strategy, then the mixed-criticality solution and optimization mechanism identifies the previously feasible solution as the optimal solution (step 418) and outputs the optimal solution (step 420) with the operation ending thereafter.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Thus, the illustrative embodiments provide mechanisms for optimization of mixed-criticality systems. Utilizing a model of uncertainty, where there are a plurality of contingency scenarios or strategies, each comprising decision variable, a multivariate objective, multivariate equality and/or inequality constraints, and a set of uncertainty parameters, the illustrative embodiments produce a solution that is simultaneously feasible under as many contingency strategies, in the criticality order, as possible, while also optimizing the objective function of a less-critical contingency strategy where the less-critical contingency strategy may be feasible in combination with other more critical contingency strategies. Specifically, the illustrative embodiments solve optimization problems, which combine strictly ordered contingency strategies with uncertainty, such as finite uncertainty, interval-based uncertainty, polyhedral uncertainty, ellipsoidal uncertainty, or the like.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system, for optimization of systems with a plurality of strategies S each having a different level of criticality, the method comprising:

receiving, by a mixed-criticality solution and optimization mechanism executed by a processor in the data processing system, the plurality of strategies S, wherein the plurality of strategies S are in a fixed order of criticality;

for each strategy s in the plurality of strategies S, obtaining, by the mixed-criticality solution and optimization mechanism, a multivariate objective function and a multivariate constraint in a multivariate decision variable;

maximizing, by feasible strategy identification logic, within the mixed-criticality solution and optimization mechanism, executed by the processor, a number of strategies of the plurality of strategies S that are feasible, i.e. work together, in combination, wherein maximizing the number of strategies of the plurality of strategies S that are feasible in combination solves:

$P(\xi):\max_x \min_\xi f^{(s)}([x^{(1)} \ldots x^{(s)}], \xi, U^{(s)})$ such that $x^{(1)} \in X(\xi, U^{(1)}), [x^{(1)} x^{(2)}] \in X(\xi, U^{(2)}); [x^{(1)} \ldots x^{(s)}] \in X(\xi, U^{(s)}); 1 \leq s \leq S$ where $P(\xi)$ denotes a problem solved, $\xi$ is a multivariate random variable, $x=[x^{(1)} \ldots x^{(s)}]$ is a mixed-criticality solution feasible for a number of strategies s, $f^{(s)}$ is an objective function of the least-critical strategy supported, X is a feasible region for a number of strategies s, $U^{(s)}$ is a set of uncertainty parameters, and S is a plurality of strategies;

generating, by vector identification logic, within the mixed-criticality solution and optimization mechanism, executed by the processor, a solution that is feasible, i.e. achievable, for the number of strategies that are feasible in combination, such that an objective of a least-critical strategy that is feasible in combination with other strategies in the number of strategies is optimized;

generating, by the feasible strategy identification logic, a contingency plan that meets a common objective using the solution that is feasible for the number of strategies that are feasible in combination, wherein the number of strategies are a number of power distribution strategies in a power system application; and executing, by the mixed-criticality solution and optimization mechanism, the contingency plan such that electricity is disconnected to one or more devices or facilities of customers who have agreed to interruptible power supply, before shedding load of customers who have not agreed to interruptible power supply thereby minimizing the number of involuntary and voluntary load shedding interventions to customers.

2. The method of claim 1, wherein the plurality of strategies S are analyzed with respect to a decreasing level of criticality.

3. The method of claim 1, wherein the multivariate constraint is at least one of a multivariate equality constraint or a multivariate inequality constraint.

4. The method of claim 3, wherein a feasible region ($X^{(s)}$) for the strategy s is defined by inequalities $F^{(s)}(x, \xi, U^{(s)}) \leq 0$ and equalities $G^{(s)}(x, \xi, U^{(s)})=0$, which make use of a set of uncertainty parameters $U^{(s)}$ for the strategy s, wherein F(s) are the inequalities for the strategy s, G(s) are the equalities for the strategy s, x is the decision variable, and $\xi$ is the multivariate random variable.

5. The method of claim 1, wherein for each strategy s in the plurality of strategies S, the multivariate objective function and the multivariate constraint allow for uncertainty therein.

6. A computer program product comprising a computer readable storage medium having a computer readable program stored therein, wherein the computer readable program, when executed on a computing device, causes the computing device to:

receive, by a mixed-criticality solution and optimization mechanism executed by the computing device, a plurality of strategies S, wherein the plurality of strategies S are in a fixed order of criticality;

for each strategy s in the plurality of strategies S, obtain, by the mixed-criticality solution and optimization mechanism, a multivariate objective function and a multivariate constraint in a multivariate decision variable;

maximize, by feasible strategy identification logic, within the mixed-criticality solution and optimization mechanism, executed by the computing device, a number of strategies of the plurality of strategies S that are feasible, i.e. work together, in combination, wherein maximizing the number of strategies of the plurality of strategies S that are feasible in combination solves:

$P(\xi):\max_x \min_x f^{(s)}([x^{(1)} \ldots x^{(s)}],\xi,U^{(s)})$ such that $x^{(1)} \in X(\xi,U^{(1)}),[x^{(1)}x^{(2)}] \in X(\xi,U^{(2)}); [x^{(1)} \ldots x^{(s)}] \in X(\xi,U^{(s)}); 1 \le s \le S$ where $P(\xi)$ denotes a problem solved, $\xi$ is a multivariate random variable, $x=[x^{(1)} \ldots x^{(s)}]$ is a mixed-criticality solution feasible for a number of strategies s, $f^{(s)}$ is an objective function of the least-critical strategy supported, X is a feasible region for a number of strategies s, $U^{(s)}$ is a set of uncertainty parameters, and S is a plurality of strategies;

generate, by vector identification logic, within the mixed-criticality solution and optimization mechanism, executed by the computing device, a solution that is feasible, i.e. achievable, for the number of strategies that are feasible in combination, such that an objective of a least-critical strategy that is feasible in combination with other strategies in the number of strategies is optimized;

generate, by the feasible strategy identification logic, a contingency plan that meets a common objective using the solution that is feasible for the number of strategies that are feasible in combination, wherein the number of strategies are a number of power distribution strategies in a power system application; and execute, by the mixed-criticality solution and optimization mechanism, the contingency plan such that electricity is disconnected to one or more devices or facilities of customers who have agreed to interruptible power supply, before shedding load of customers who have not agreed to interruptible power supply thereby minimizing the number of involuntary and voluntary load shedding interventions to customers.

7. The computer program product of claim 6, wherein the plurality of strategies S are analyzed with respect to a decreasing level of criticality.

8. The computer program product of claim 6, wherein the multivariate constraint is at least one of a multivariate equality constraint or a multivariate inequality constraint.

9. The computer program product of claim 8, wherein a feasible region $(X^{(s)})$ for the strategy s is defined by inequalities $F^{(s)}(x, \xi, U^{(s)}) \le 0$ and equalities $G^{(s)}(x, \xi, U^{(s)})=0$, which make use of a set of uncertainty parameters $U^{(s)}$ for the strategy s, wherein F(s) are the inequalities for the strategy s, G(s) are the equalities for the strategy s, x is the decision variable, and his the multivariate random variable.

10. The computer program product of claim 6, wherein for each strategy s in the plurality of strategies S, the multivariate objective function and the multivariate constraint allow for uncertainty therein.

11. An apparatus comprising:
a processor; and
a memory coupled to the processor, wherein the memory comprises instructions which, when executed by the processor, cause the processor to:
receive, by a mixed-criticality solution and optimization mechanism executed by the processor, a plurality of strategies S, wherein the plurality of strategies S are in a fixed order of criticality;
for each strategy s in the plurality of strategies S, obtain, by the mixed-criticality solution and optimization mechanism, a multivariate objective function and a multivariate constraint in a multivariate decision variable;
maximize, by feasible strategy identification logic, within the mixed-criticality solution and optimization mechanism, executed by the processor, a number of strategies of the plurality of strategies S that are feasible, i.e. work together, in combination, wherein maximizing the number of strategies of the plurality of strategies S that are feasible in combination solves:

$P(\xi):\max_x \min_x f^{(s)}([x^{(1)} \ldots x^{(s)}],\xi,U^{(s)})$ such that $x^{(1)} \in X(\xi,U^{(1)}),[x^{(1)}x^{(2)}] \in X(\xi,U^{(2)}); [x^{(1)} \ldots x^{(s)}] \in X(\xi,U^{(s)}); 1 \le s \le S$ where $P(\xi)$ denotes a problem solved, $\xi$ is a multivariate random variable, $x=[x^{(1)} \ldots x^{(s)}]$ is a mixed-criticality solution feasible for a number of strategies s, $f^{(s)}$ is an objective function of the least-critical strategy supported, X is a feasible region for a number of strategies s, $U^{(s)}$ is a set of uncertainty parameters, and S is a plurality of strategies;

generate, by vector identification logic, within the mixed-criticality solution and optimization mechanism, executed by the processor, a solution that is feasible, i.e. achievable, for the number of strategies that are feasible in combination, such that an objective of a least-critical strategy that is feasible in combination with other strategies in the number of strategies is optimized;

generate, by the feasible strategy identification logic, a contingency plan that meets a common objective using the solution that is feasible for the number of strategies that are feasible in combination, wherein the number of strategies are a number of power distribution strategies in a power system application; and execute, by the mixed-criticality solution and optimization mechanism, the contingency plan such that electricity is disconnected to one or more devices or facilities of customers who have agreed to interruptible power supply, before shedding load of customers who have not agreed to interruptible power supply thereby minimizing the number of involuntary and voluntary load shedding interventions to customers.

12. The apparatus of claim 11, wherein the plurality of strategies S are analyzed with respect to a decreasing level of criticality.

13. The apparatus of claim 11, wherein the multivariate constraint is at least one of a multivariate equality constraint or a multivariate inequality constraint.

14. The apparatus of claim 13, wherein a feasible region $(X^{(s)})$ for the strategy s is defined by inequalities $F^{(s)}(x, \xi, U^{(s)}) \le 0$ and equalities $G^{(s)}(x, \xi, U^{(s)})=0$, which make use of a set of uncertainty parameters $U^{(s)}$ for the strategy s, wherein F(s) are the inequalities for the strategy s, G(s) are the equalities for the strategy s, x is the decision variable, and $\xi$ is the multivariate random variable.

15. The apparatus of claim 11, wherein for each strategy s in the plurality of strategies S, the multivariate objective function and the multivariate constraint allow for uncertainty therein.

* * * * *